United States Patent [19]
Waltz et al.

[11] Patent Number: 4,633,374
[45] Date of Patent: Dec. 30, 1986

[54] PHOTOGRAPHIC LIGHT DIFFUSER

[75] Inventors: Thomas A. Waltz, Toledo; John E. Shirilla, Youngstown, both of Ohio

[73] Assignee: The F. J. Westcott Co., Toledo, Ohio

[21] Appl. No.: 697,921

[22] Filed: Feb. 4, 1985

[51] Int. Cl.$^4$ .......................................... F21V 17/02
[52] U.S. Cl. ...................................... 362/17; 362/18; 362/352
[58] Field of Search ............... 362/3, 16, 17, 18, 431, 362/450, 352, 358, 319

[56] References Cited

U.S. PATENT DOCUMENTS

| | | | |
|---|---|---|---|
| 923,542 | 6/1909 | Losey | 362/16 |
| 2,105,225 | 8/1936 | Pollock . | |
| 2,205,860 | 6/1940 | Olds | 362/18 |
| 2,794,906 | 6/1957 | Edgerton . | |
| 3,294,962 | 2/1965 | Hilzen . | |
| 3,429,320 | 9/1966 | Edelkind . | |
| 3,781,535 | 12/1973 | Larson . | |
| 3,851,164 | 11/1974 | Intrator | 362/18 |
| 3,870,874 | 7/1973 | Larson . | |
| 3,873,821 | 3/1975 | Larson . | |
| 4,075,472 | 2/1978 | Higuchi | 362/16 |
| 4,187,531 | 2/1979 | Lowell et al. . | |
| 4,428,030 | 1/1984 | Baliozian | 362/18 |
| 4,443,837 | 4/1984 | Migliori et al. . | |
| 4,446,506 | 5/1984 | Larson | 362/18 |
| 4,460,946 | 7/1984 | Tinz | 362/18 |
| 4,464,708 | 8/1984 | Nüssli et al. . | |
| 4,524,405 | 6/1985 | Heard | 362/18 |

OTHER PUBLICATIONS

Brochure entitled *Chimera* no source or publication data avaiable to 4/85 Applicant.

*Primary Examiner*—William A. Cuchlinski, Jr.
*Assistant Examiner*—D. M. Cox
*Attorney, Agent, or Firm*—Emch, Schaffer, Schaub & Porcello Co.

[57] ABSTRACT

A photographic light diffuser is disclosed having a support rod and collapsible frame with a plurality of ribs and stretchers. The frame and support rod are covered by a translucent panel at one end and a reflective panel at the other end which together define an interior chamber for receiving a light source. Access to the interior is provided by one or more closeable openings in the cover.

39 Claims, 10 Drawing Figures

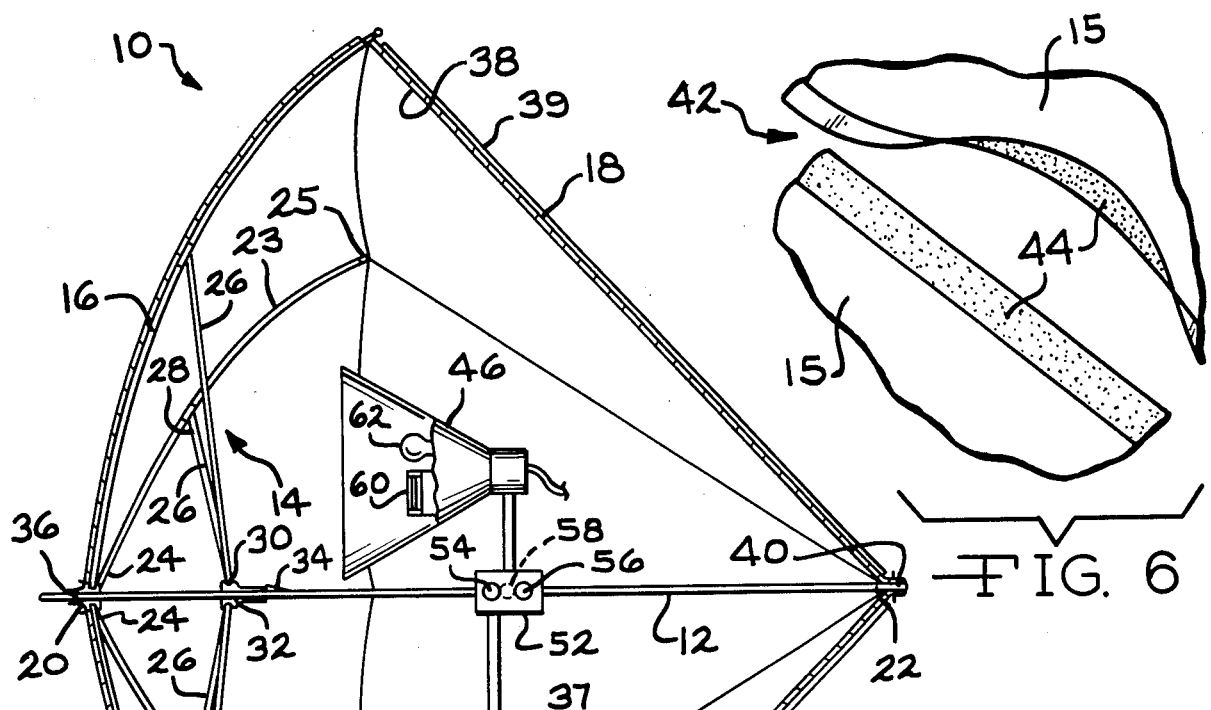
FIG. 4
FIG. 6
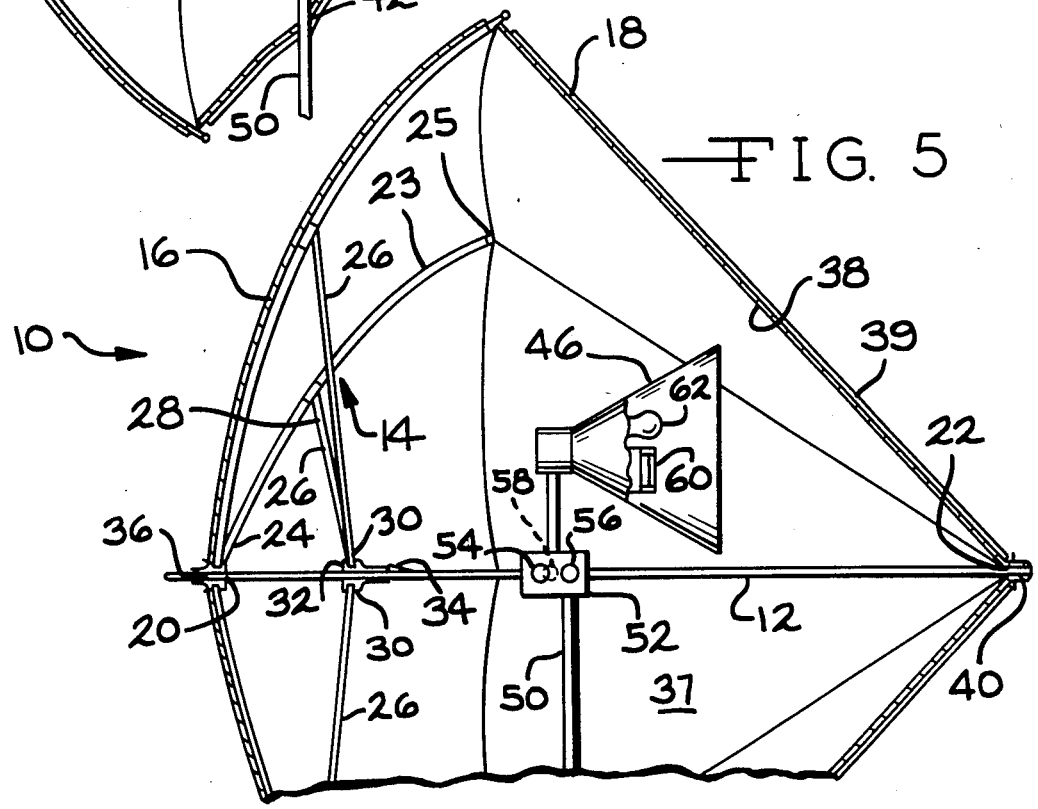
FIG. 5

PHOTOGRAPHIC LIGHT DIFFUSER

BACKGROUND OF THE INVENTION

The present invention relates to a light diffuser for use with light sources in photography. Diffused or indirect lighting is used in both still and motion picture type photography. To achieve an indirect, soft type lighting effect it is desirable to first either directly or indirectly pass the light through a semi-transparent material to break up and diffuse the light rays. Such lighting is generally produced by light sources which are remote from the camera.

Each particular area to be lighted will dictate the type and intensity of light that will be needed. In some situations direct light from the light source without any alternation may be required. In other situations direct light may be too strong or cast overly distinct shadows in which case a more diffuse light will be more desirable. In still other cases an even more indirect diffuse light may be needed to create the proper lighting effect. It is also desirable to have a light diffuser that is a compact, self-contained unit that is easy to position and use.

It is therefore an object of the present invention to provide a photographic light diffuser which will give varying degrees of diffuse lighting.

It is another object of the present invention to provide a photographic light diffuser that will yield such lighting through a device that is lightweight, compact and easily transported and stored.

It is a further object of the present invention to provide a photographic light diffuser that is useable with a wide variety of light sources.

Other objects and advantages of the present invention will become more apparent from a further review of the following specification, drawings and claims.

SUMMARY OF THE INVENTION

The present invention relates to a photographic light diffuser for use in conjunction with a light source to provide various types of diffuse light for photographic purposes. The diffuser has a support rod with a first end and a second end. Connected to the first end of the support rod is a collapsible frame structure which when opened extends radially away from the support rod to form a substantially parabolic shaped frame structure.

The frame consists of a plurality of ribs pivotally connected to the first end of the support rod. Connected at the midpoint of the ribs are a corresponding plurarlity of stretchers whose opposite ends are pivotally and slideably connected to a runner slidably positioned about the support rod. The frame is kept in the open position by a releasable lock mechanism in the support rod which prevents the runner from retracting once the frame has been expanded radially outward.

The ribs of the frame are covered by a translucent panel of white nylon. The area between the ends of the ribs and the second end of the support rod are covered by a reflective panel with a reflective silver color interior and a black exterior. Closeable openings are provided in either of the panels or both to provide access to the interior of the diffuser for mounting a light source.

The light source mounted inside the diffuser can either be aimed directly at the translucent panel or first reflected off the reflective panel to diffuse the light even more before it passes through the translucent panel.

BRIEF DESCRIPTION OF THE DRAWINGS

FIG. 4 is a cross-sectional side view of a photographic light diffuser, taken along line 4—4 of FIG. 1, with a light source mounted on the support rod to emit light primarily in the direction of the translucent panel according to the present invention.

FIG. 5 is a partial cross-sectional side view of a photographic light diffuser with a light source mounted to emit light primarily in the direction of the reflective panel.

FIG. 6 is an enlarged view of one of the openings in the cover of the diffuser as shown in FIGS. 2, 3 and 4 according to the present invention.

DESCRIPTION OF THE PREFERRED EMBODIMENT

Figure 1:
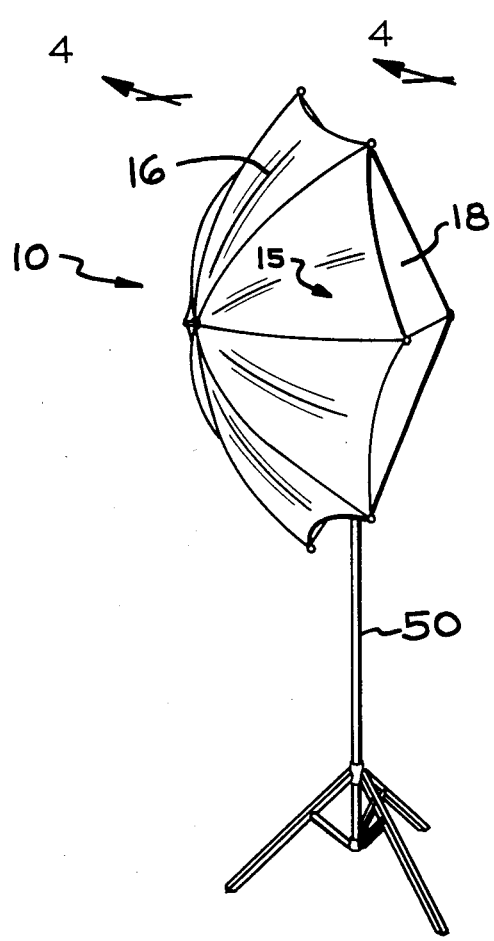
FIG. 1 is a perspective side view of a photographic light diffuser mounted on a floor stand according the present invention.

The present invention relates to a photographic ligh diffuser 10 as shown in the attached Figures. The diffuser 10 generally consists of a support rod 12, a frame assembly 14 and a cover 15 including a translucent panel 16 and reflective panel 18.

The support rod 12 has a first end 20, a second end 22 and serves to support the frame assembly 14. The frame assembly 14 is connected to the first end 20 of the support rod 12 and forms a substantially parabolic shaped structure around the support rod 12 and defines an opening when the frame is in the open position. Normally the opening defined by the frame 14 is substantially circular and the support rod 12 passes through substantially the center of the circular opening. See FIGS. 1 and 4. The frame assembly 14 is comprised of a plurality of ribs 23 having a first end 24 and a second end 25. The first ends 24 of the ribs 23 are pivotally connected to the first end 20 of the support rod 12. A corresponding plurality of stretchers 26 are connected to the ribs 23. Each of the stretchers 26 has a first end 28 and a second end 30. The first ends 28 of the stretchers 26 are pivotally connected to the ribs 23 at substantially the midpoint of the ribs 23. The second ends 30 of stretchers 26 are pivotally and slideably connected to the support rod 12 via a runner 32 positioned about the support rod 12. The runner 32 can be advanced along the support rod 12 to move the stretchers to a position where the collapsible frame 14 is in an open position as shown in FIGS. 4 and 5. In the open position the second ends 25 of the ribs 23 are radially spaced apart from the support rod 12 and define a substantially parabolic shaped structure. The second ends 25 of the ribs 23 also define a substantially circular opening around the support rod 12.

To maintain the frame 14 in an open position a retractable lock mechanism 34, as is typically found on umbrellas, is positioned within and extends from the support rod 12 near its first end 20. See FIGS. 4 and 5. When the frame 14 is moved from a closed position, as in FIG. 3, to an open position, as in FIGS. 4 and 5, the runner 32 is advanced along support rod 12 in a direction towards the first end 20. The lock mechanism 34 retracts into the rod 12 as the runner 32 passes over it. Once the runner has completely passed the lock 34, the lock mechanism extends from the support rod 12 and engages the runner 32. The lock mechanism 34 thereby holds the runner 32 in this position on the support rod 12 and retains the frame assembly 14 in the open position. To close the frame 14, the lock mechanism 34 is depressed thus retracting it back into the support rod 12 and allowing the runner 32 to advance back toward the second end 22 of support rod 12.

The frame 14 is covered with a translucent fabric panel 16 such as white nylon or other suitably translucent material. The translucent fabric 16 contains a tip cap 36 and the tip cap 36 is disposed for receiving the first end 20 of the support rod 12 to attach the translucent fabric to the support rod 12. The outer periphery of the translucent fabric 16 is also fastened to the second end 25 of each of the ribs 23 as can be seen in FIGS. 4 and 5. The translucent panel 16 is supported by the ribs 23 of the frame 14 and the ribs hold the translucent panel 16 in a substantially parabolic shape. The tip cap 36 is positioned substantially in the center of the translucent fabric 16. The translucent panel 16 thus substantially covers the substantially parabolic shaped frame 14.

The opposite end of the diffuser 10 is covered by a reflective panel 18 which extends from the second end 22 of the support rod 12 to the circular opening defined by the frame 14. The reflective panel 18 is sewn to the translucent panel 16 thus forming an enclosed chamber 37. The interior surface 38 of the reflective panel 18 is reflective. Silver colored nylon or other similarly reflective surfaced fabrics may be used for the interior surface 38 of the reflective panel 18. The outer surface 39 of the reflective panel 18 is black or some other dark color to retard light trnsmission through the reflective panel 18.

A ferrule 40 is located in the reflective panel 18 adjacent the second end 22 of support rod 12. The ferrule 40 fits over the second end 22 of the support rod 12 when the diffuser 10 is open thereby securing the reflective panel 18 on the support rod 12.

Figure 2:
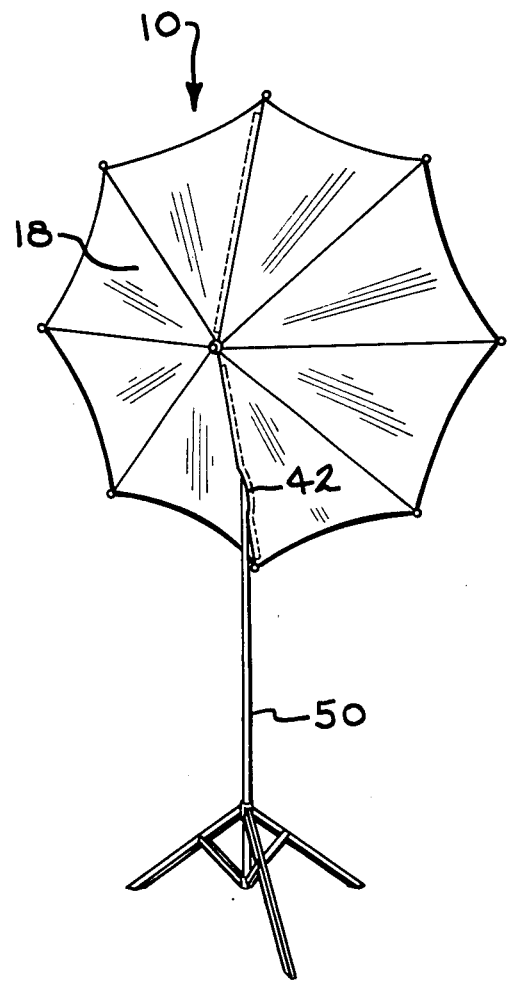
FIG. 2 is a rear view of a photographic light diffuser mounted on a floor stand according to the present invention.
Figure 3:
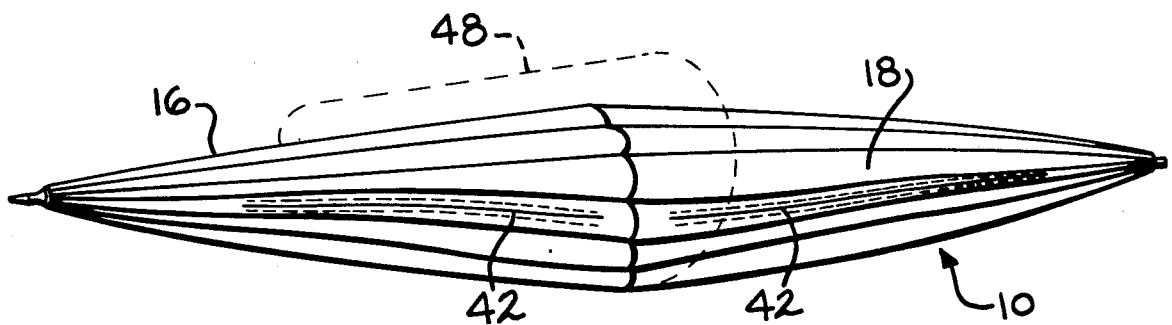
FIG. 3 is a side view of a photographic ligh diffuser in the collapsed position according to the present invention.
Figure 8:
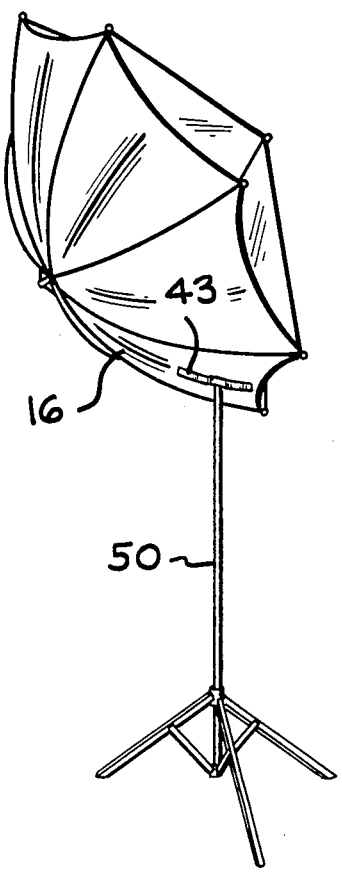
FIG. 8 is a perspective view of the photographic light diffuser.

Access to the interior of the enclosed chamber 37 of the diffuser 10 is possible via one or more closeable openings positioned in the cover 15. In FIG. 8 the opening 41 is shown located in the translucent panel 16 of cover 15 while in FIGS. 2 and 4 the opening 42 is located in the reflective panel 18. In addition, an opening can be located in both the translucent panel 16 and the refective panel 18 as shown in FIG. 3. The openings 41 and 42 provide ready access to the interior of the diffuser 10 and allow the diffuser to be positioned in almost any position on a standard support stand 50. As shown in FIG. 8, the opening 41 allows the diffuser to be directed in a downward direction. The opening 42 shown in FIG. 4 allows the diffuser to be directed from slightly downward to an upward direction.

Figure 7:
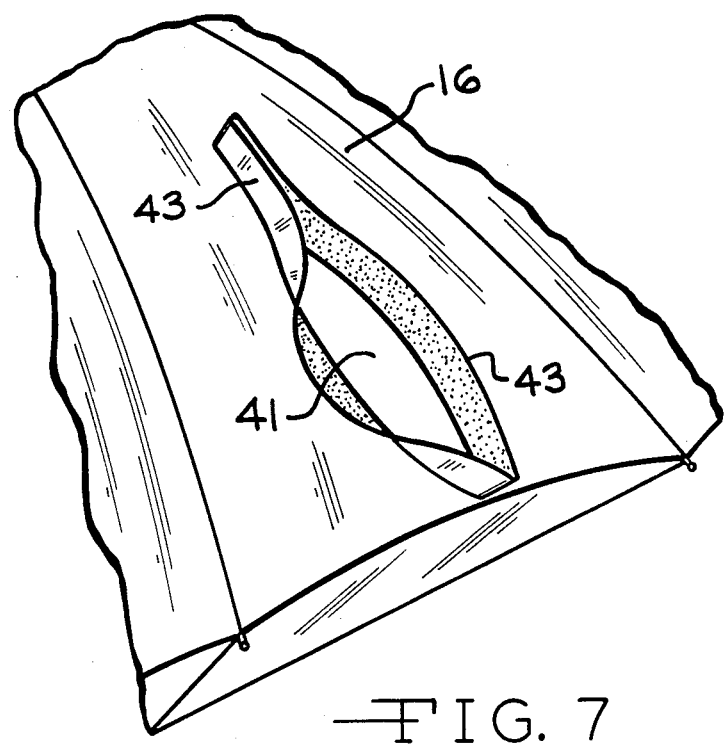
FIG. 7 is an enlarged view of the opening in the cover of the diffuser shown in FIG. 8.

An enlarged view of the opening 41 is shown in FIG. 7. The closeable opening 41 consists of a longitudinal slit in the translucent panel 16 with resealable velcro strips 43 positioned in opposed relationship on either edge of the opening 41. The velcro strips 43 releasably join the edges of the opening. The closeable opening 41 must be sufficiently large to allow the insertion of a hooded light source 46 such as shown in FIGS. 4 and 5. Typically an opening 41 in the translucent panel 16 extends from the circular opening defined by the frame 14 part way along the translucent panel. However it should be understood that an opening 41 of almost any length can be used.

An enlarged view of the opening 42 is shown in FIG. 6. The closeable opening 42 consists of a longitudinal slit in the cover 15 with resealable velcro strips 44 positioned on either edge of the opeing 42 to releasably join the edges. The closeable opeing 42 must be sufficiently large to allow the insertion of a hooded light source 46 such as is shown in FIGS. 4 and 5. Similarly, a closeable opening in the reflective panel 18 would extend substantially from the second end 22 of the support rod 12 to the circular opening defined by the frame 14.

When the diffuser 10 is in the collapsed position, it resembles the configuration shown in FIG. 3. In the collapsed position the ribs 23 and stretchers 26 of the frame 14 extends along the support rod 12 from the first end 20 towards the second end 22 and the ferrule 40 is detached from the second end 22 of rod 12. As a result, the reflective panel portion 18 of the diffuser 10 can be folded over upon the translucent panel 16, as shown by the dotted line 48 in FIG. 3, thereby providing a compact unit for easy storage and transportation.

To open the diffuser 10, the ferrule 40 is placed over the second end 22 of the support rod 12 while the runner 32 is advanced toward the first end 20 of rod 12. As the runner 32 is advanced, the ribs 23 and stretchers 26 of the frame 14 extends radially away from the support rod 12 to form a substantially parabolic shaped frame configuration. In the open position, the translucent fabric panel 16 and the reflective panel 18 are held in a substantially taut position so that there is essentially no sag or loose fabric on the diffuser 10.

Referring to FIGS. 4 and 5, once the diffuser 10 is in the open position, a light source 46 can be placed within the interior chamber 37 through opening 42 in the cover 15 and adjustably mounted to the support rod 12. In addition, the diffuser 10 can be mounted on a support stand 50 to raise the diffuser 10 up off the ground and allow vertical and rotational adjustment of the diffuser 10. See FIGS. 1, 2, 4 and 5.

In FIGS. 4 and 5 the light source 46 and stand 50 are mounted to the support rod 12 by an adjustable mounting block 52. By loosening and retightening the frictional adjustment knobs 54, 56 and 58, the light 46 and the stand 50 can be moved back and forth along support rod 12. In addition both the vertical height and the rotation of the light 46 and stand 50 can be adjusted. Having completed the adjustment, the velcro strips 44 on opening 42 are then pressed together, thereby sealing the diffuser 10 about the stand 50 and preventing stray light from interfering with the desired lighting effect. As can be seen in FIGS. 4 and 5, the light source 46 can be equipped with either a strobe type light 60, a conventional light bulb 62 or both types of bulbs.

The parabolic shape of the frame 14 and translucent panel 16 allows the light from light source 46 to illuminate a large area. The light from the light source can fan out or disperse in a radial fashion to completely fill the surface of the translucent panel 16. Thus, the light from the light source can fan out to cover a large area. The intensity of the light is strongest around the center of the translucent panel 16 adjacent the support rod 12. The intensity of the light from the light source decreases progressively as it moves from the center of the translucent panel 16 towards the outer periphery of the translucent panel. Accordingly, light of varying degress of intensity are emitted from the translucent panel and this can be used to create the desired lighting effect on the subject that is to be photographed. Also the parabolic shape of the translucent panel allows light to be dispersed radially from the diffuser 10 to cover a larger area to further assist in obtaining the desired lighting effect on the subject to be photographed. The position of the light source 46 in the diffuser 10 can also be varied to vary the pattern of light emitted from the translucent panel 16.

Referring to FIG. 4, the light source 46 is shown aimed directly at the traslucent panel 16 of cover 15 while in FIG. 5 the light source 46 is shown aimed toward the reflective panel 18. When a stronger more localized type of diffuser lighting is desired, the user positions the light source as it is shown in FIG. 4. This causes a relatively strong yet diffuse light to be cast upon the subject matter or area to be photographed, thereby allowing the photographer to properly illuminate the intended subject matter without creating heavy well defined shadows in the background of the picture. In this configuration a larger pattern of light is emitted from the diffuser 10 as the light source 46 is moved in a direction away from the translucent panel 16 along the support rod 12. The farther the light source is spaced apart from the translucent panel 16 the more the light can radially disperse to fill a larger portion of the translucent panel 16. Thus, position of the light source in the diffuser 10 can be used to vary the pattern of light emitted from the diffuser onto the object to be photographed.

If a more subtle, broad type of diffuse light is required, the user can position the light source as it is shown in FIG. 5. By aiming the light source 46 at the reflective panel 18, the light pattern is broken up even more before it passes through the translucent front panel 16. As a result, the light emitted from the diffuser 10 is much softer than that achieved by the position of the light source 46 in FIG. 4, thereby allowing the photographer a means for easily adjusting the effect of the light source upon the subject matter. In this configuration a larger pattern of light is emitted from the diffuser 10 as the light source 46 is moved in a direction towards the translucent panel 16 along the support rod 12. The farther the light source is spaced apart from the reflective panel 18 the more the light can radially disperse to contact a larger portion of the reflective panel 18. The larger the area of the reflective panel that is filled with light the larger the pattern of reflective light that is directed towards the translucent panel 16. Thus, position of the light source in the diffuser 10 can be used to vary the pattern of light reflected from the reflective panel 18 and the pattern of light emitted from the translucent panel 16 onto the object to be photograhed.

When the particular lighting session is completed, the diffuser 10 can either be removed from the light source 46 and used with another light source or simply collapsed, folded and stored until needed. The diffuser 10 is a complete unit that is easily opened and collapsed without the use of special tools.

Figure 9:
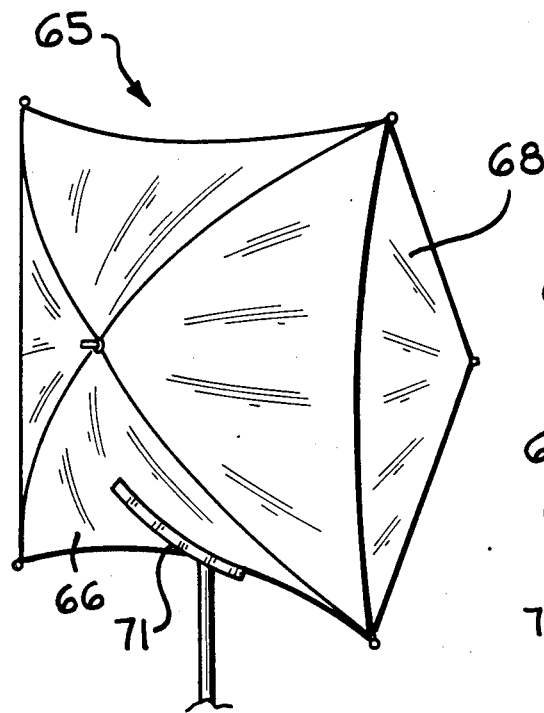
FIG. 9 is a perspective view of another embodiment of the photographic light diffuser.
Figure 10:
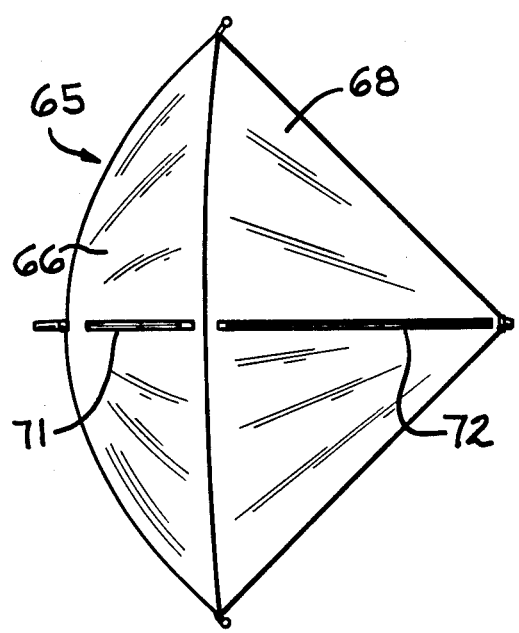
FIG. 10 is a side view of the photographic light diffuser of FIG. 9.

FIGS. 9 and 10 show another embodiment of the photographic light diffuser of the present invention. This embodiment of the diffuser 65 is substantially similar in construction and use as the previously discussed diffuser 10. However in this embodiment the frame defines an opening around the support shaft that is substantially square shaped. Accordingly, the translucent panel 66 has a substantially square shaped outer periphery and the outer periphery of the translucent panel 66 defines a substantially square opening when the frame is in the open position. The frame and translucent panel 66 define a substantially parabolic shaped structure. The reflective panel 68 is joined to the translucent panel 66 and support rod as previously described. The diffuser 65 emits a substantially square pattern of diffused light whereas the diffuser 10 emits a substantially circular pattern of diffused light. Depending on the characteristics desired in photographing an object it may be desirable to have a circular or square pattern of light to illuminate the subject.

Having thus described the invention in detail it should be understood that various other modifications and changes can be made in the invention without departing from the scope and spirit of the following claims.

What we claim is:

1. A photographic light diffuser comprising:
   a support rod having a first end and a second end;
   a frame structure connected to said first end of said support rod, said frame extending radially away from said support rod to form a substantially parabolic structure around said support rod, said frame structure defining an opening around said support rod when said frame is in an open position, said second end of said support rod extending from said opening of said substantially parabolic frame;
   a cover including a translucent fabric panel and a reflective fabric panel, said translucent fabric panel being positioned on said frame, said translucent panel substantially covering said substantially parabolic frame, said reflective fabric panel extending from said second end of said support rod to said opening defined by said frame, said reflective panel being joined to said translucent panel at said opening to enclose said support rod;
   a closeable opening positioned in said cover to provide access to the interior of said light diffuser.

2. The photographic light diffuser of claim 1, wherein said frame is collapsible, said frame having an open position that defines said substantially parabolic structure and a closed position; said frame extending along said support rod from said first end towards said second end when said frame is in said collapsed position.

3. The photographic light diffuser of claim 1, wherein said frame is comprised of a plurality of ribs that are pivotally connected to said first end of said support rod.

4. The photographic light diffuser of claim 3, wherein said frame contains a corresponding plurality of stretchers, said stretchers having a first end pivotally connected to each of said ribs and a second end pivotally and slideably connected to said support rod wherein said stretchers are advanced along said support rod in a direction towards said first end of said support rod to position said frame in said open position.

5. The photograhic light diffuser of claim 4, wherein said stretchers are attached to said ribs at substantially the mid point of said ribs.

6. The photographic light diffuser of claim 4, wherein a runner is slideably positioned on said support rod, said runner receiving said second ends of said stretchers wherein said runner can be advanced along said support rod to move said stretchers to a position where said frame is in said open position.

7. The photographic light diffuser of claim 6, wherein a releaseable lock mechanism is positioned in said support rod, said lock mechanism being disposed to secure said runner and said second ends of said stretchers in a position to maintain said frame in said open position.

8. The photograhic light diffuser of claim 1, wherein said closeable opening is located in said reflective panel and extends substantially from said second end of said support rod to said circular opening defined by said frame.

9. The photogrphic light diffuser of claim 1, wherein said closeable opening is located in said translucent panel and extends substantially from said first end of said support rod towards said opening defined by said frame.

10. The photographic light diffuser of claim 1, wherein said closeable opening in said cover includes a velcro seal for releasably joining the edges of said panel that define said opening whereby said opening can be reusably opened and closed.

11. The photographic diffuser of claim 1, wherein said reflective panel of fabric has a ferrule positioned to receive said second end of said support rod, said ferrule securing said reflective panel of fabric on said support rod.

12. The photographic light diffuser of claim 1, wherein a light source is positioned within said light diffuser.

13. The photographic light diffuser of claim 12, wherein said light source positioned within said light diffuser is mounted to said support rod.

14. The photographic light diffuser of claim 12, wherein said light source is positioned within said light diffuser such that said light source emits light primarily in the direction of said translucent fabric panel.

15. The photograhic light diffuser of claim 12, wherein said light source positioned within said light diffuser emits light primarily in the direction of said reflective panel whereby said emitted light is reflected off said reflective panel before passing through said translucent fabric panel.

16. The photographic light diffuser of claim 1, wherein said closeable opening is disposed for receiving a floor stand for mounting said diffuser off the floor.

17. The photographic light diffuser of claim 1, wherein said translucent fabric panel comprises white nylon.

18. The photographic light diffuser of claim 1, wherein said reflective panel comprises a reflective silver color interior and a black exterior.

19. The photograhic light diffuser of claim 1, wherein said opening defined by said frame is substantially circular and said outer periphery of said translucent panel is substantially circular.

20. The photographic light diffuser of claim 19, wherein said support rod passes through substantially the center of said opening defined by said frame.

21. The photographic light diffuser of claim 1, wherein said opening defined by said frame is substantially square and said outer periphery of said translucent panel is substantially square.

22. A photograhic light diffuser comprising:
a support rod having a first end and a second end;
a collapsible frame connected to said first end of said support rod, said frame having a collapsed position and an open position; said frame extending from said first end along said support rod towards said second end when said frame is in said collapsed position, said frame extending radially away from said support rod to form a substantially parabolic frame defining a substantially circular opening around said support rod when said frame is in said open position, said second end of said support rod extending from said substantially circular opening of said substantially parabolic frame;
a cover including a translucent fabric panel and a reflective fabric panel, said translucent fabric panel being positioned on said collapsible frame, said translucent panel substantially covering said substantially parabolic frame when said frame is in said open position and collapsing with said frame along said support rod when said frame is in said collapsed position, said reflective panel of fabric extending from said second end of said support rod to said circular opening defined by said frame, said reflective panel being joined to said translucent panel at said circular opening to enclose said support rod, said reflective fabric having a reflective interior surface that faces said support rod and a black outer surface;
a closeable opening positioned in said cover to provide access to the interior of the light diffuser.

23. The photograhic light diffuser of claim 22, wherein said collapsible frame is comprised of a plurality of ribs that are pivotally connected to said first end of said support rod.

24. The photographic light diffuser of claim 23, wherein said frame contains a corresponding plurality of stretchers, said stretchers having a first end pivotally connected to each of said ribs and a second end pivotally and slideably connected to said support rod wherein said stretchers are advanced along said support rod in a direction towards said first end of said support rod to position said collapsible frame in said open position.

25. The photographic light diffuser of claim 24, wherein said stretchers are attached to said ribs at substantially the mid point of said ribs.

26. The photographic light diffuser of claim 24, wherein a runner is slideably positioned on said support rod, said runner receiving said second end of said stretchers whereby said runner can be advanced along said support rod to move said stretchers to a position where said collapsible frame is in said open position.

27. The photographic light diffuser of claim 26, wherein a releasable lock mechanism is positioned in said support rod, said lock mechanism being disposed to secure said runner and said second ends of said stretchers in a position to maintain said collapsible frame in said open position.

28. The photograhic light diffuser of claim 22, wherein said closeable opening is located in said reflective panel and extends substantially from said second end of said support rod to said circular opening defined by said frame.

29. The photographic light diffuser of claim 28, wherein said closeable opening in said reflective panel includes a velcro seal for releasably joining the edges of said reflective panel that define said opening whereby said opening can be reusably opened and closed.

30. The photographic light diffuser of claim 22, wehrein said closeable opening is located in said translucent panel and extends substantially from said first end of said support rod towards said circular opening defined by said frame.

31. The photographic light diffuser of claim 30, wherein said closeable opening in said translucent panel includes a velcro seal for releasably joining the edges of said translucent panel that define said opening whereby said opening can be reusably opened and closed.

32. The photographic light diffuser of claim 22, wherein said reflective panel has a ferrule positioned to receive said second end of said supported rod, said ferrule securing said reflective panel of fabric on said support rod.

33. The photographic light diffuser of claim 22, wherein a light source is positioned within said photographic light diffuser.

34. The photographic light diffuser of claim 33, wherein said light source positioned within said light diffuser is mounted to said support rod.

35. The photographic light diffuser of claim 33, wherein said light source is positioned within said light diffuser such that said light source emits light primarily in the direction of said translucent fabric panel.

36. The photographic light diffuser of claim 33, wherein said light source is positioned within said light diffuser such that said light source emits light primarily in the direction of said reflective panel whereby said emitted light is reflected off said reflective panel before passing through said translucent fabric panel.

37. The photographic light diffuser of claim 22, wherein said closeable opening is disposed for receiving a floor stand for mounting said light diffuser off the floor.

38. The photograhic light diffuser of claim 22, wherein said translucent fabric panel comprises white nylon.

39. A photograhic light diffuser comprising:
a support rod having a first end and a second end;
a collapsible frame connected to said first end of said support rod; said frame having a collapsed position and an open position; said frame extending from said first end along said support rod towards said second end when said frame is in said collapsed position, said frame extending radially away from said support rod to form a substantially parabolic frame defining a substantially circular opening around said support rod when said frame is in said open position, said second end of said support rod extending from said substantially circular opening of said semicircular frame;
said collapsible frame having a plurality of ribs pivotally connected to said first end of said support rod;
said collapsible frame having a corresponding plurality of stretchers, said stretchers having a first end pivotally connected to substantially the midpoints of said ribs and a second end pivotally connected to a runner slideably positioned on said support rod whereby said runner can be advanced along said support rod to move said stretchers to a position where said collapsible frame is in said open position;
a releasable lock mechanism positioned in said support rod, said lock mechanism being disposed to secure said runner and said second ends of said stretchers in a position to maintain said collapsible frame in said open position;
a cover including a translucent fabric panel and a reflective fabric panel, said translucent fabric panel being positioned on said collapsible frame, said translucent panel substantially covering said substantially parabolic frame when said frame is in said open position and collapsing with said frame along said support rod when said frame is in said collapsed position, said reflective fabric panel extending from said second end of said support rod to said circular opening defined by said frame, said reflective panel being joined to said translucent panel at said circular opening to enclose said support rod, said reflective fabric panel having a reflective interior surface that faces said support rod and a black outer surface;
a ferrule positioned in said reflective fabric panel to receive said second end of said support rod, said ferrule securing said reflective fabric panel on said support rod; and
a closeable opening positioned in said cover to provide access to the interior of said light diffuser, said closeable opening including a velcro seal for releasably joining the edges of said cover that define said opening whereby said opening can be reusably opened and closed.

* * * * *